United States Patent
Hickman et al.

(10) Patent No.: US 11,237,918 B2
(45) Date of Patent: Feb. 1, 2022

(54) AUTOMATED INTEGRATION OF VIDEO EVIDENCE WITH DATA RECORDS

(71) Applicant: TASER International, Inc., Scottsdale, AZ (US)

(72) Inventors: Glenn M. Hickman, Scottsdale, AZ (US); Michael J. Bohlander, Seattle, WA (US); Manish Menghani, Seattle, WA (US); Alexander Mersereau, Seattle, WA (US); Patrick W. Smith, Scottsdale, AZ (US); Andreas M. Olligschlaeger, Baden, PA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 1151 days.

(21) Appl. No.: 14/687,483

(22) Filed: Apr. 15, 2015

(65) Prior Publication Data
US 2016/0259794 A1    Sep. 8, 2016

Related U.S. Application Data

(60) Provisional application No. 62/127,804, filed on Mar. 3, 2015.

(51) Int. Cl.
*G06F 11/14*    (2006.01)
*G06F 16/61*    (2019.01)
(Continued)

(52) U.S. Cl.
CPC ...... *G06F 11/1461* (2013.01); *G06F 11/1464* (2013.01); *G06F 16/2477* (2019.01);
(Continued)

(58) Field of Classification Search
CPC .......... G06F 17/30041; G06F 17/3056; G06F 17/30044; G06F 17/30551; G06F 17/30784
(Continued)

(56) References Cited

U.S. PATENT DOCUMENTS 6,430,562 B1 *   8/2002   Kardos ................... G06Q 10/06
7,251,343 B2 *   7/2007   Dorrell .............. H04N 1/32144
                                                              382/100

(Continued)

OTHER PUBLICATIONS

"How To Auto Populate on Datetime on Insert or Update" (Year: 2014).*

(Continued)

*Primary Examiner* — Ashish Thomas
*Assistant Examiner* — Abdullah A Daud
(74) *Attorney, Agent, or Firm* — Andrew Graham

(57) ABSTRACT

A computer system receives event data associated with data records in a database, receives metadata corresponding to a digital media content file (e.g., a video, audio, or image file), compares the event data with the metadata, automatically identifies a matching event based on the comparison, and automatically tags the content file by modifying the metadata based on event data associated with the matching event. In one usage scenario, the digital media content file may be used as evidence in a criminal investigation. The event data may be provided in the form of a summary or snapshot of the database, which may include data records covering a limited period of time. The digital media content file can be recorded by any suitable digital media device, such as a video camera. The computer system may further include a dock configured to upload digital media content received from the digital media device.

29 Claims, 4 Drawing Sheets

(51) Int. Cl.
| | |
|---|---|
| *G06F 16/71* | (2019.01) |
| *G06F 16/81* | (2019.01) |
| *G06F 16/25* | (2019.01) |
| *G06F 16/487* | (2019.01) |
| *G06F 16/48* | (2019.01) |
| *G06F 16/951* | (2019.01) |
| *G06F 16/2458* | (2019.01) |
| *G06F 16/78* | (2019.01) |

(52) U.S. Cl.
CPC ............ *G06F 16/252* (2019.01); *G06F 16/48* (2019.01); *G06F 16/487* (2019.01); *G06F 16/489* (2019.01); *G06F 16/61* (2019.01); *G06F 16/71* (2019.01); *G06F 16/78* (2019.01); *G06F 16/81* (2019.01); *G06F 16/951* (2019.01); *G06F 2201/84* (2013.01)

(58) Field of Classification Search
USPC ........................................................ 707/738
See application file for complete search history.

(56) References Cited

U.S. PATENT DOCUMENTS

| | | | |
|---|---|---|---|
| 7,894,519 B2* | 2/2011 | Winningstad ............ G07C 1/10 348/143 |
| 8,458,193 B1* | 6/2013 | Procopio ............... G06F 16/313 707/749 |
| 9,275,127 B1 | 3/2016 | Liao et al. | |
| 10,318,543 B1* | 6/2019 | Sharifi ............. G06F 16/24573 |
| 2003/0090572 A1 | 5/2003 | Belz | |
| 2004/0146272 A1 | 7/2004 | Kessel et al. | |
| 2006/0224619 A1* | 10/2006 | Kang ................. H04N 21/6125 |
| 2006/0224636 A1* | 10/2006 | Kathuria ............. G06F 11/1471 |
| 2007/0027938 A1 | 2/2007 | Clarke | |
| 2007/0150445 A1* | 6/2007 | DeBie .................... G06Q 40/08 |
| 2007/0168715 A1 | 7/2007 | Herz et al. | |
| 2008/0256099 A1* | 10/2008 | Chodorov ............. G06Q 10/10 |
| 2008/0303902 A1* | 12/2008 | Romer ................. G07F 19/207 348/143 |
| 2009/0216813 A1* | 8/2009 | Olivieri ............... G06F 16/2358 |
| 2009/0251545 A1 | 10/2009 | Shekarri et al. | |
| 2009/0276531 A1 | 11/2009 | Myka | |
| 2009/0290022 A1 | 11/2009 | Uhm | |
| 2009/0307201 A1* | 12/2009 | Dunning ................. G06F 16/68 |
| 2010/0207949 A1* | 8/2010 | Spencer .................. G06T 13/40 345/473 |
| 2012/0023099 A1 | 1/2012 | Crossley et al. | |
| 2012/0079512 A1* | 3/2012 | Nambakkam ...... H04N 21/2225 725/4 |
| 2012/0179676 A1* | 7/2012 | Park .................... G06F 16/5866 707/736 |
| 2012/0274846 A1 | 11/2012 | Kimura et al. | |
| 2013/0027552 A1* | 1/2013 | Guzik .................. H04N 21/632 348/143 |
| 2013/0073302 A1* | 3/2013 | Ryan ...................... G06Q 10/06 705/2 |
| 2013/0073576 A1* | 3/2013 | Lillethun ................ H04W 4/38 707/758 |
| 2013/0188300 A1* | 7/2013 | Schrock ............... G11B 33/124 361/679.01 |
| 2013/0218840 A1* | 8/2013 | Smith ................. G06F 11/1662 707/639 |
| 2013/0275296 A1* | 10/2013 | Tietzen .............. G06Q 30/0279 705/39 |
| 2014/0101453 A1 | 4/2014 | Senthurpandi | |
| 2014/0129521 A1 | 5/2014 | Marsden | |
| 2014/0164266 A1 | 6/2014 | Guzik | |
| 2014/0229312 A1* | 8/2014 | Nuggehalli ............ G06Q 30/08 705/26.3 |
| 2014/0232863 A1* | 8/2014 | Paliga .................. H04N 21/278 348/143 |
| 2014/0337346 A1* | 11/2014 | Barthel ................. G06F 16/435 707/738 |
| 2014/0337482 A1 | 11/2014 | Houston et al. | |
| 2014/0351217 A1 | 11/2014 | Bostock | |
| 2014/0368601 A1* | 12/2014 | deCharms ............... H04L 67/26 348/14.02 |
| 2014/0372561 A1* | 12/2014 | Hisano ................. G08G 1/0112 709/217 |
| 2015/0248589 A1* | 9/2015 | Broache ............... G06K 9/6807 382/182 |
| 2015/0261389 A1* | 9/2015 | Abate ..................... H04L 51/16 715/741 |
| 2015/0350711 A1 | 12/2015 | Guzik | |
| 2015/0379530 A1* | 12/2015 | Bostick .................. G06Q 50/01 705/7.31 |
| 2016/0037227 A1* | 2/2016 | Benn ................... H04N 21/4828 725/53 |
| 2016/0085789 A1 | 3/2016 | Fuchs | |
| 2016/0140146 A1* | 5/2016 | Wexler ................ G06F 16/5846 707/741 |
| 2016/0170980 A1* | 6/2016 | Stadnisky ............... H04L 67/06 726/7 |
| 2016/0286156 A1* | 9/2016 | Kovac .................... F41C 33/029 |
| 2017/0263072 A1* | 9/2017 | Wahli ..................... G07F 9/002 |

OTHER PUBLICATIONS

"Project54: introducing advanced technologies in the Police cruiser", Feb. 2002. Published in IEEE.*
Larson, Soleymani, Serdyukov, Automatic Tagging and Geotagging in Video Collections and Communities, Apr. 17-20, 2011, ICMR, Trento, Italy.
IPhone Video Metadata, CSI Tech, Mar. 3, 2015, pp. 1-3, http://www.csitech.co.uk/iphone-video-metadata/.
QuickDME—Digital Media Evidence Manager, (Brochure) www.oceansystems.com/QuickDME, Burtonsville, Maryland.
Ocean Systms Releases QuickDME—Digital Evidence Asset Manager, May 28, 2014, www.oceansystems.com/QuickDME, Burtonsville, Maryland.
Acquire: Acquiring Raw Video and Metadata, May 3, 2015, http://archiveguide.witness.org/acquire/acquiring-raw-video-and-metadata.
Implementing OAuth 2.0 Authentication, Google Developers, May 3, 2015, pp. 1-6, https://developers.google.com/youtube/v3/guides/authentication.
European Patent Office, Extended European Search Report for European Patent Application No. 15884149.4 dated Aug. 22, 2018.
R. A. Messner et al., "Mobile digital video system for law enforcement", IEEE 55th Vehicular Technology Conference, VTC Spring 2002, May 2002, pp. 468-472.

* cited by examiner

| Badge ID | Start Time | End Time | Event ID | Event Type | Street | City |
|---|---|---|---|---|---|---|
| O50 | 9/21/14 0:39 | 9/21/14 1:31 | 14-164829 | PUBLIC ORDER | 1340 S 200 E | SALT LAKE CITY |
| O04 | 9/21/14 0:39 | 9/21/14 1:13 | 14-164829 | PUBLIC ORDER | 1340 S 200 E | SALT LAKE CITY |
| 81L | 9/21/14 1:08 | 9/21/14 1:32 | 14-164827 | LARCENY | 51 E 700 S | SALT LAKE CITY |
| N92 | 9/21/14 1:03 | 9/21/14 2:42 | 14-164844 | | | |
| M80 | 9/21/14 1:05 | 9/21/14 2:42 | 14-164844 | | | |
| M39 | 9/21/14 1:10 | 9/21/14 1:26 | 14-164844 | | | |
| I23 | 9/21/14 1:00 | 9/21/14 2:13 | 14-164832 | ESCAPE | 200 S 1500 W | SALT LAKE CITY |
| O39 | 9/21/14 0:44 | 9/21/14 1:49 | 14-164832 | ESCAPE | 200 S 1500 W | SALT LAKE CITY |
| O39 | 9/21/14 1:49 | 9/21/14 2:10 | 14-164832 | ESCAPE | 200 S 1500 W | SALT LAKE CITY |
| M39 | 9/21/14 2:36 | 9/21/14 2:46 | 14-164879 | PUBLIC PEACE | 161 W 600 S | SALT LAKE CITY |
| O64 | 9/21/14 2:32 | 9/21/14 3:03 | 14-164879 | PUBLIC PEACE | 161 W 600 S | SALT LAKE CITY |
| M90 | 9/21/14 2:33 | 9/21/14 2:46 | 14-164879 | PUBLIC PEACE | 161 W 600 S | SALT LAKE CITY |
| O58 | 9/21/14 0:04 | 9/21/14 1:34 | 14-164809 | LARCENY | 36 E 700 S | SALT LAKE CITY |
| O64 | 9/21/14 0:04 | 9/21/14 0:28 | 14-164809 | LARCENY | 36 E 700 S | SALT LAKE CITY |
| O64 | 9/21/14 0:28 | 9/21/14 1:30 | 14-164809 | LARCENY | 36 E 700 S | SALT LAKE CITY |

FIG. 2

AUTOMATED INTEGRATION OF VIDEO EVIDENCE WITH DATA RECORDS

CROSS-REFERENCE TO RELATED APPLICATION

This application claims the benefit of U.S. Provisional Patent Application No. 62/127,804, filed on Mar. 3, 2015, the disclosure of which is hereby incorporated by reference in its entirety.

BACKGROUND

Body-mounted or "on-officer" video provides an effective solution for law enforcement agencies to decrease complaints against officers and reduce use of force. However, the quantity of files that are produced by on-officer video deployments result in unprecedented data management issues for these organizations. Prematurely deleting evidence or being unable to find the proper file can undermine an investigation and prosecution. Having officers manually add the information necessary to ensure this does not happen wastes valuable officer time and can never be completely accurate.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a computer system receives event data associated with a plurality of data records in a database (e.g., a records management system (RMS) or computer-aided dispatch (CAD) database) and receives metadata corresponding to a digital media content file (e.g., a video, audio, or image file). In one usage scenario, the digital media content file may be used as evidence in a criminal investigation. The event data may be provided in the form of a summary or snapshot of the database, which may include data records covering a limited period of time. The computer system performs a comparison of at least a portion of the event data with at least a portion of the metadata. The comparison may include, for example, comparing a user identifier (e.g., a badge ID for a police officer that recorded the digital media content) in the metadata with a user identifier in the event data and comparing a time frame (e.g., a start time and end time) in the event data with a time frame in the metadata. The computer system automatically identifies a matching event for the digital media content file based on the comparison. The matching event is associated with at least one of the data records. The computer system automatically tags the digital media content file by modifying the metadata based on event data associated with the matching event. Modifying the metadata may include adding an event identifier, an event type, or a location to the metadata. The metadata may be included in the digital media content file.

The computer system can analyze the modified metadata in response to a search query. The search query may include a search parameter, and the modified metadata may include metadata corresponding to the search parameter. The computer system can provide search results based on the analysis of the modified metadata.

In another aspect, a server computer detects event data in a destination folder, encrypts the event data, and uploads the encrypted event data, which is decrypted before performing the comparison. The digital media content file can be recorded by any suitable digital media device, such as a video camera. The computer system may further include a dock configured to upload digital media content received from the digital media device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a table depicting event data in a database snapshot;

DETAILED DESCRIPTION

Figure 1:
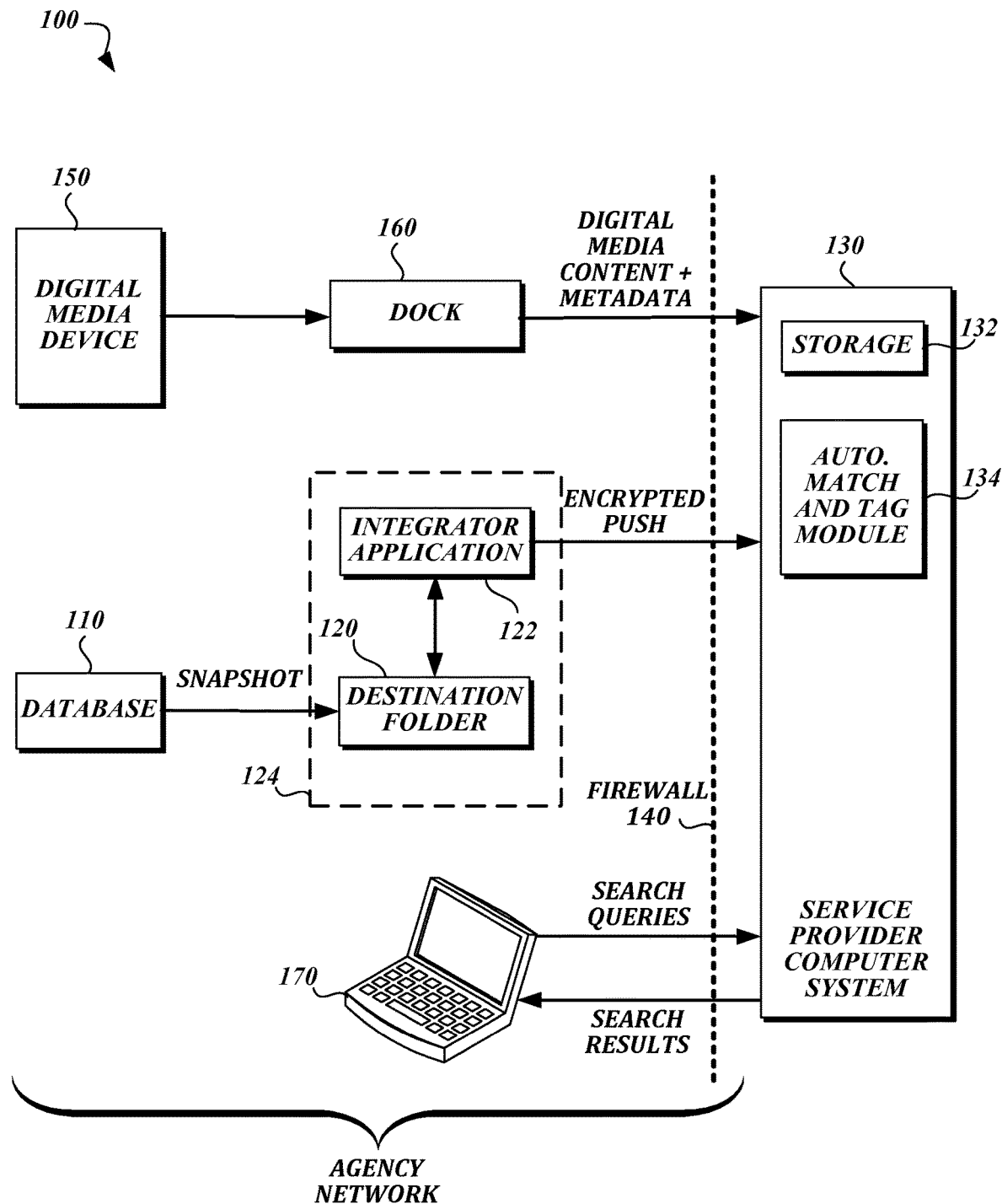
FIG. 1 is a block diagram depicting an illustrative computer system configured to perform automated matching and tagging of digital media content.

Embodiments of the present disclosure are generally directed to techniques and tools for automated integration of digital media content (e.g., video, audio, or still images) with data records (e.g., records associated with a records management system (RMS) or computer-aided dispatch (CAD) system). For example, one or more embodiments can be used to allow law enforcement agencies to automatically link video taken by officers in the field (e.g., with a body-mounted or vehicle dash-mounted video camera) to data records relating to events (e.g., incidents under investigation). Described embodiments allow digital media content evidence to be efficiently and accurately associated with particular events and information associated with those events, such as event types, locations, users (e.g., police officers that recorded the content), or the like.

Described embodiments include an illustrative computer system that implements a matching algorithm that can be used to automatically match digital media content with such records. The illustrative system can be deployed in a law enforcement context in order to effectively manage collection and organization of digital media content evidence. In such a context, benefits of the systems and techniques described herein may include greater accuracy, increased efficiency, and reduced cost.

As described herein, metadata associated with digital media content can be modified automatically, which can help to avoid errors (such as misspellings) and incomplete information associated with manual data entry. The modified metadata can make searching for content easier and more accurate. The illustrative system frees officers from manual video tagging, reduces involvement of IT staff, and can work with any records system without involving RMS/CAD system vendors. The reduction in time that may otherwise be spent by officers, IT staff, vendors, and the like can translate into significant cost reductions. By automating the addition of metadata to videos or other digital media content that officers record, RMS and CAD integrations can provide significant gains in efficiency and accuracy over prior systems.

In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

The technological solutions described herein provide technological benefits relating to, for example, processing and handling of digital media content (e.g., digital video) and related metadata within computer systems. It will be understood that although systems and processes are described herein in terms of "evidence," "law enforcement," and the like in order to describe illustrative usage scenarios, the disclosed subject matter is not inherently legal in nature or limited to organization of human activities.

Illustrative System

In this section, an illustrative system that performs automated matching and tagging of digital media content is described. Although specific details and arrangements are described in this section for the purpose of illustration, many alternatives to the illustrative system are possible in accordance with principles described herein.

FIG. 1 is a block diagram depicting an illustrative computer system 100 configured to perform automated matching and tagging of digital media content. The illustrative system 100 includes components of an agency network (e.g., a law enforcement agency's network) and a service provider computer system 130. In the example shown in FIG. 1, a summary of records is exported from a database 110 in the form of a snapshot (e.g., a CSV or XML file). In practice, the database 110 may be an RMS database, a CAD database, a combined RMS/CAD database, or some other database comprising records to be integrated with digital media content. In at least one embodiment, a regularly recurring, automated snapshot of the database is generated (e.g., every 12 hours, 24 hours, etc.) from the database 110. The regularity with which the snapshot is generated can serve to place a limit on the time lag between the uploading of the digital media content and the tagging and matching process. It should be understood that data also can be obtained from the database 110 in other ways, such as by obtaining potentially relevant database entries through direct queries to the database, or by generating database snapshots on an as-needed basis instead of, or in combination with, regularly generated snapshots.

In the example shown in FIG. 1, an integrator application 122 acts as an intermediary between the database 110 and the service provider computer system 130. Once the snapshot is generated, it is sent to a destination folder 120, which is monitored by the integrator application 122. When a snapshot is detected, the integrator application 122 performs an encrypted push operation in which the integrator application encrypts the snapshot, uploads the encrypted snapshot to a service provider computer system 130, and deletes the snapshot from the destination folder 122. Encryption of the event data helps to secure the event data against both outside and inside security threats. In at least one embodiment, the destination folder 120 contains no data before the snapshot is sent, thereby allowing the integrator application 122 to proceed on the assumption that whatever data is detected in the destination folder 120 is a valid snapshot and can be processed accordingly. Typically, for security reasons, the agency network also includes a firewall 140. Information can be securely transmitted to and from the agency network through the firewall 140, e.g., via port 443 in a secure sockets layer (SSL) transmission.

In at least one embodiment, the integrator application 122 and the destination folder 120 reside on the same device (e.g., server 124) for ease of communication and to avoid or simplify potential network permission issues. (If the integrator application 122 is on a different device, it may need to be provided with both copy and delete permissions in the destination folder 120.) In at least one embodiment, the integrator application 122 uses .NET Framework, version 4.0, available from Microsoft Corporation, and uses AES encryption with a 256-bit key size. Alternatively, other encryption techniques or key sizes can be used.

In the example shown in FIG. 1, a digital media device 150 (e.g., a digital video camera, audio recorder, or the like) transmits digital media content to a dock 160 (e.g., via a direct physical connection, wired or cable connection, or wireless connection). The dock may be configured to automatically upload the digital media content and related metadata to the service provider computer system 130. In one usage scenario, a user (e.g., a law enforcement officer) records digital video content on a video camera during a work shift and inserts the camera into a suitably configured dock 160 at the end of the shift. Alternatively, the digital media device 150 may upload the digital media content and metadata to the service provider computer system 130 without using the dock 160. For example, the digital media device may be connected to or paired with a smart phone, notebook computer, tablet computer, or other device that provides upload capabilities with a wired or wireless Internet connection, mobile network connection, or other secure network connection.

The system 100 may provide the ability to secure the digital media content, metadata, or other information in several ways. For example, the digital media device 150 or the dock 160 may provide encryption functionality to secure the transmission of digital media content, metadata, etc., against both outside and inside security threats, and to protect privacy of the individuals involved. As another example, the service provider computer system 130 may require successful authentication of the user, digital media device 150, and/or dock 160 before allowing the upload to proceed. The body-mounted video camera may have a unique identifier that can be provided for authentication purposes and/or added to metadata of the video being uploaded. As another example, the service provider computer system 130 may provide encryption functionality to secure stored digital media content, metadata, etc., as well as to secure any information that is sent back to the agency network (e.g., in response to search queries for digital media content that may relate to a particular investigation).

The service provider computer system 130 includes storage 132 and an automated matching and tagging module 134. The service provider computer system 130 stores the content and metadata in storage 132, which may be any suitable storage medium. In practice, the content and metadata may be stored together in the storage 132 or separately. At times, metadata may be retrieved from persistent storage and stored in memory of the service provider computer system 130 to allow quicker access during automated tagging and/or matching processes performed by the automated matching and tagging module 134, as described in further detail below. The service provider computer system 130 can automatically tag the uploaded digital media content with relevant information (e.g., Incident ID, Category, and Location) with reference to the snapshot and match the uploaded digital media content with data records represented in the snapshot, as described in further detail below. Content tagging and matching can be monitored in the service provider computer system 130 by a monitoring application (not shown), which can perform functions such as monitoring success or failure of matching operations.

The automated matching and tagging module 134 can make searching for content easier and more accurate, e.g., by modifying metadata of digital media content based on results of the automated matching and tagging process. Whereas initial metadata associated with a digital media content file may have only basic information, the automated matching and tagging module 134 can modify the metadata to include additional information such as event identifiers, event types, and the like, as described in further detail below. In this way, the metadata associated with digital media content files can be enriched, allowing searches to be more productive. In one possible scenario, an authenticated computing device 170 on an agency network sends search queries for potentially relevant content to the service provider computer system 130. The search queries may include search parameters such as an event identifier, event type, location, or the like, which can be compared with metadata associated with files that have been processed by the automated matching and tagging module 134. Potentially relevant search results can be provided in responses to search queries. The service provider computer system 130 may allow authorized users to securely download or stream digital media content that may be found during a search, e.g., by providing a hyperlink to a corresponding file.

FIG. 2 depicts a table 200 that represents a snapshot generated from an RMS or CAD database of a law enforcement agency. In the example shown in FIG. 2, the snapshot contains the following fields, which may be presented in the snapshot in any order:

1. User identifier (e.g., a Badge ID for the officer that recorded a video);
2. Start Time (officer arrival time—when the officer took the call);
3. End Time (officer departure time—when the officer closed the call);
4. Event identifier (e.g., Event ID);
5. Event type (category);
6. Street (address); and
7. City.

These fields are only examples, and may be supplemented with other fields (e.g., equipment IDs for police vehicles, camera equipment, or the like). The fields that are used in a particular implementation may vary depending on factors such as the design and content of the database from which the snapshot is generated, requirements of other programs that may use the data, or other factors. For example, location can be recorded in terms of a street address (e.g., the Street and City fields shown in FIG. 2) and/or in some other way (e.g., GPS coordinates), and the way in which location is recorded may be based on requirements of a mapping program (e.g., Bing Maps, available from Microsoft Corporation).

In the example shown in FIG. 2, some of the records represented in the snapshot do not have all of the fields populated. In particular, records associated with Event ID 14-164644 have no values associated with the Event Type, Street, and City fields. This may occur when a data record has been created but lacks complete information for the event. Such records may still be used in an automated matching and tagging process, as described in further detail below, even if the ability to tag corresponding digital media content will be somewhat limited by the missing information.

Referring again to FIG. 1, the computer system 100 may include functionality for improving data integrity. For example, in at least one embodiment, Badge IDs for officers in the snapshot are required to match Badge IDs in corresponding officers' profiles in the service provider computer system 130. In some circumstances (such as where Badge IDs were inaccurately entered or have been updated), the service provider computer system 130 may resolve differences in Badge ID values by, for example, changing one or more Badge IDs in the snapshot or in the officers' profiles.

The computer system 100 may include functionality for accurate mapping of data fields, such as Event Types and categories. In at least one embodiment, the service provider computer system 130 compares a list of possible Event Types that could be present in the snapshot with a list of categories in the service provider computer system 130. If the lists are not identical, the service provider computer system 130 may need mapping instructions. For example, each CAD or RMS Event Type in a snapshot can be mapped to an appropriate category by the service provider, with all possible Event Types being correlated with one or more categories. In one possible mapping technique, multiple Event Types can be mapped to a single category in the service provider computer system 130, if needed.

Values in the snapshot and/or the service provider computer system 130 may be subject to restrictions in terms of permissible data types, value ranges, and/or the like. For example, in at least one embodiment, there is a two-character minimum for the Badge ID field.

An agency can set requirements on category/event type mapping, standardization of user identifiers (e.g., badge IDs or other unique IDs for police officers or other emergency responders), or the like. The computer system 100 may include functionality for conformance with such requirements, such as functionality described above with respect to data integrity, permissible data types and/or value ranges, accurate mapping, etc. Snapshots can be validated to ensure that they conform to requirements. Validation of snapshots may involve, at least at an initial stage, multiple iterations to ensure that correct data is being pulled from correct fields. Test runs can be performed by a service provider and the results can be verified and shared with the agency. Adjustments can be made by the service provider and/or the agency to ensure accuracy.

Illustrative Matching and Tagging Algorithm

In this section, an illustrative digital media content matching and tagging algorithm is described that can be used to match digital media content (e.g., video, audio, or still image evidence in a criminal investigation) with data records and tag the content with additional metadata based on the results of the matching process. In a law enforcement context, such metadata may include an incident identifier, an incident location, and an incident category. Although specific details are described in this section for the purpose of illustration, digital media content can be matched with database entries and tagged in other ways, in accordance with principles described herein.

Figure 3:
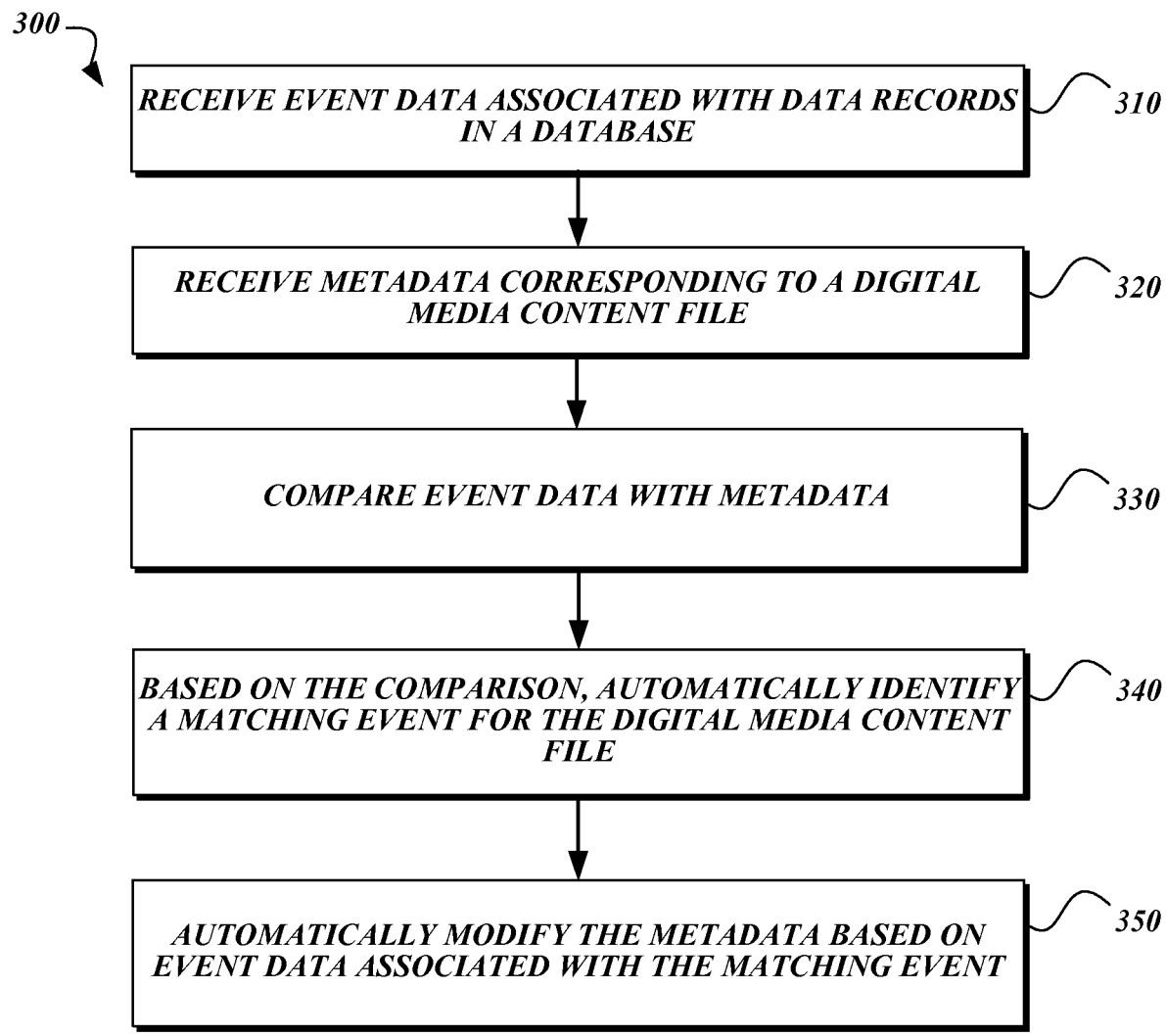
FIG. 3 is a flow chart diagram of an illustrative automated matching and tagging process that can be performed within the computer system of FIG. 1.

FIG. 3 is a flow chart diagram of an illustrative matching and tagging process 300 that can be performed in a computer system, such as the service provider computer system 130 shown in FIG. 1. At step 310, the system receives event data associated with data records in a database. The event data can be provided in the form of database snapshots (e.g., CAD or RMS snapshots) generated on a regular basis (e.g., daily or twice per day), as described above. The event data is associated with data records that correspond with one or more events, such as incidents that a law enforcement agency responded to. The event data may include data fields such as "Incident ID" or "Event ID"; "Officer ID" or "Badge ID"; "Start Time" and "End Time"; "Location" (e.g., a street address or GPS coordinates), and "Category" or "Event Type" (e.g., an incident type such as "Larceny," "Domestic Disturbance," etc.).

The exact formats, data size, and other characteristics of the event data can differ based on organizational factors such as agency requirements and/or technological factors such as the processing power and data storage limitations of available computing resources, data transmission rates and protocols, and the like. In at least one embodiment, a service provider converts received event data into an internal common format so the matching can be done in a generic way for a variety of customers (such as multiple law enforcement agencies), which allows data processing to proceed in a more efficient and timely manner.

Referring again to FIG. 3, at step 320 the system receives metadata corresponding to a digital media content file, and at step 330, the system compares the event data with the metadata. If the metadata and/or event data are encrypted, the system decrypts the encrypted data before performing the comparison. In at least one embodiment, initial metadata for unmatched digital media content is obtained, and each entry S of the event data is processed to search for matches.

At step 340, the system automatically identifies a matching event for the digital media content file based on the comparison. Matches can be detected in different ways, depending on the content of the initial metadata, the content of the event data, and other factors. Referring again to FIG. 1, at least some of the initial metadata may be generated automatically, e.g., by the digital media device 150 that was used to record the content. As an example, an uploaded video may contain, in its initial metadata, an Officer ID, a Start Time, and an End Time. Given this initial metadata, a match can be identified if there is an uploaded video V such that S(Officer ID)=V(Officer ID), S(Start Time)≤V(Start Time), and V(End Time)≤S(End Time).

Alternatively, matches can be identified based on different kinds of comparisons, or comparisons of different attributes or combinations of attributes. For example, a match may be identified based on the values of V(Officer ID) and V(Start Time), without regard to V(End Time), based on the assumption that a match should be identified for any video made by an officer that begins within a specified time window, regardless of when the video ends. This can account for situations where the officer inadvertently continues recording longer than necessary, which may place V(End Time) beyond the value of S(End Time). As another example, if GPS or other location data is included in the initial metadata, matches may be identified based on comparisons of Start Time, End Time, and location information. For a greater degree of certainty of the match, the comparisons of Start Time, End Time, and location information can be combined with a comparison of a user identifier (e.g., Officer ID).

In at least one embodiment, the earliest and latest records represented in the event data can define a time window to use for the matching process. Uploads of digital media content files can sometimes be delayed for long periods of time, e.g., due to an officer's schedule, unexpected emergencies, etc. If an officer waits 48 hours to upload files, the matching process for that day's CAD/RMS data may run before this transfer. To avoid a situation where no match will occur, snapshots can contain data in a "look-back" window that exceeds the regular time interval (e.g., 12 hours, 24 hours, etc.) between snapshots. For example, if an agency is generating snapshots on a daily (24-hour) schedule, the snapshots can include the previous 3 days (72 hours) worth of data to try to capture videos in the matching process that were uploaded within 72 hours of being captured in the field. The look-back window can help to ensure that files will be tagged correctly if they are uploaded within the predefined time period after an event. The look-back window can be set as a 2- or 3-times multiple of the regular time interval, or any other desired length of time.

Digital media content that was created within the time window can be requested by the automated tagging and matching module 134 of the service provider computer system 130. In response to the request, the service provider computer system 130 may retrieve metadata from persistent storage and store it in memory of the service provider computer system 130 to allow quicker access during automated tagging and/or matching processes performed by the automated matching and tagging module 134. The automated matching and tagging module 134 processes metadata and does not need to process the digital media content itself to perform automated tagging and matching. This aspect provides significant benefits from a technical perspective (e.g., in terms of reduced processing time) and also allows the digital media content to remain securely stored during such processing.

Referring again to FIG. 3, at step 350 the system automatically tags the digital media content file by modifying the metadata (e.g., by adding to or updating the metadata) based on event data associated with matching event. For example, the automated tagging and matching module 134 can automatically add metadata fields or update values of metadata fields for the digital media content, depending on the information that is available for the matching event. For example, metadata fields such as such as "Incident Identifier," "Category," and "Location" can be added to the metadata. Each field can provide benefits on its own or in combination with other fields. For example, the "Incident Identifier" may be useful for allowing digital media content to be found in response to database queries for evidence relating to a particular incident. As another example, "Location" may be useful for allowing database queries by location. As another example, "Category" may be associated with a time period for which evidence of that category should be retained, which can be helpful for complying with agency rules or other laws or regulations regarding retention of data or evidence.

In the illustrative snapshot 200 shown in FIG. 2, some of the records represented in the snapshot do not have all of the fields populated with values. In particular, records associated with Event ID 14-164644 have no values associated with the Event Type, Street, and City fields. As mentioned above, such records may still be used in an automated matching and tagging process, even if the ability to tag corresponding digital media content may be somewhat limited by the missing information. For example, a video uploaded by the officer associated with Badge ID N92 may be matched to a corresponding entry in the snapshot 200 based on the Badge ID, Start Time, and End Time. The matching video still can be tagged with the corresponding Event ID based on the information in the snapshot 200, even though the Event Type, Street, and City are missing. Subsequent snapshots may include updated information for Event ID 14-164644, and the metadata for the matching video may be updated accordingly.

Matching digital media content with database entries can also allow the system to detect and correct data entry errors, thereby enhancing data integrity. For example, if an officer has the ability to manually set the "Incident ID" in the field, the illustrative matching algorithm can detect any discrepancies between the manually-entered "Incident ID" and the "Incident ID" from the CAD/RMS database, and correct it.

In at least one embodiment, the system can detect inconsistent or duplicative data in snapshots. For example, referring again to FIG. 1, the automated matching and tagging module 134 may detect that there are multiple database entries each having the same Badge ID, Start Time, and End Time. This may occur, for example, where multiple Event IDs are inadvertently assigned to the same underlying event. This detection capability may be useful to prevent duplicate matches if a rule requires an individual digital media file to be matched with no more than one database entry, or to avoid tagging content with incorrect metadata.

Although it may be desirable in most cases to associate an individual digital media file with no more than one database entry, there can be exceptions to this rule. For example, it may be possible for a recorded video to be relevant to multiple incidents that happened to take place at the same time and location. To accommodate these and other situations, the system can be configured to provide manual matching and/or manual tagging functionality that may be used to supplement results of an automated matching and tagging process.

Illustrative Computing Devices and Operating Environments

Unless otherwise specified in the context of specific examples, described techniques and tools may be implemented by any suitable computing device or set of devices.

In any of the described examples, a data store contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

Some of the functionality described herein may be implemented in the context of a client-server relationship. In this context, server devices may include suitable computing devices configured to provide information and/or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information and/or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 4:
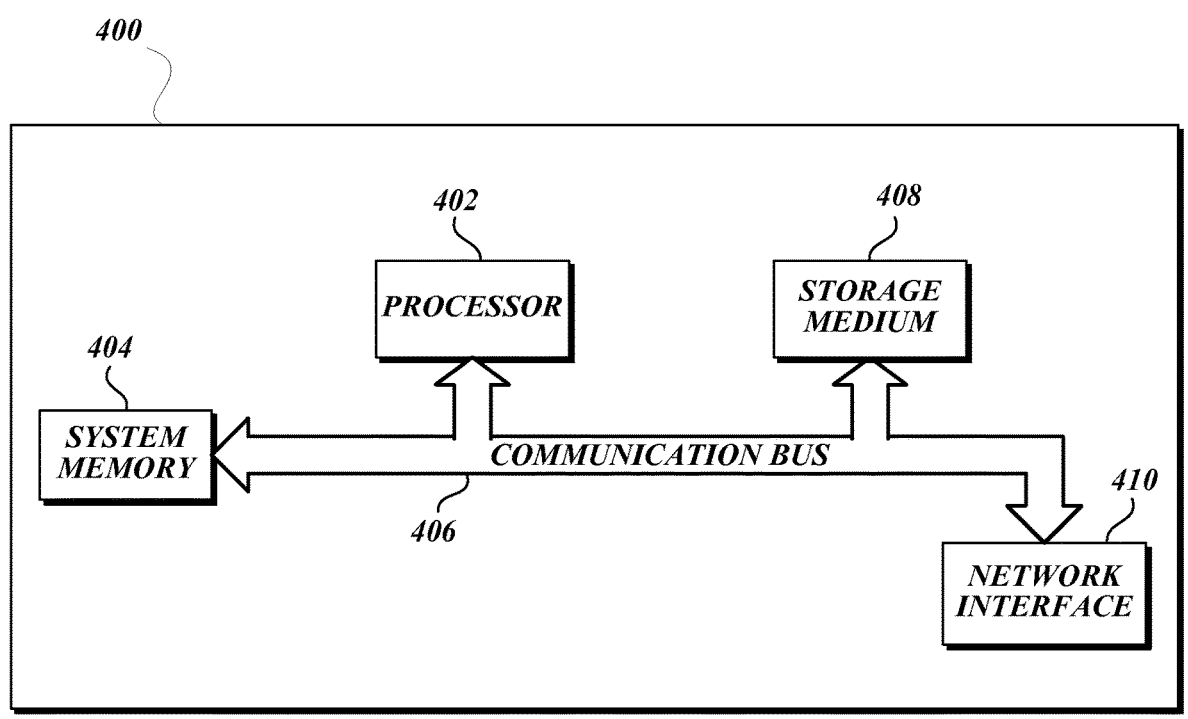
FIG. 4 is a block diagram that illustrates basic aspects of a computing device appropriate for use in accordance with embodiments of the present disclosure.

FIG. 4 is a block diagram that illustrates aspects of an illustrative computing device 400 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 400 includes at least one processor 402 and a system memory 404 connected by a communication bus 406. Depending on the exact configuration and type of device, the system memory 404 may be volatile or nonvolatile memory, such as read only memory ("ROM"), random access memory ("RAM"), EEPROM, flash memory, or other memory technology. Those of ordinary skill in the art and others will recognize that system memory 404 typically stores data and/or program modules that are immediately accessible to and/or currently being operated on by the processor 402. In this regard, the processor 402 may serve as a computational center of the computing device 400 by supporting the execution of instructions.

As further illustrated in FIG. 4, the computing device 400 may include a network interface 410 comprising one or more components for communicating with other devices over a network. Embodiments of the present disclosure may access basic services that utilize the network interface 410 to perform communications using common network protocols. The network interface 410 may also include a wireless network interface configured to communicate via one or more wireless communication protocols, such as WiFi, 2G, 3G, 4G, LTE, WiMAX, Bluetooth, and/or the like.

In the illustrative embodiment depicted in FIG. 4, the computing device 400 also includes a storage medium 408. However, services may be accessed using a computing device that does not include means for persisting data to a local storage medium. Therefore, the storage medium 408 depicted in FIG. 4 is optional. In any event, the storage medium 408 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like.

As used herein, the term "computer-readable medium" includes volatile and nonvolatile and removable and nonremovable media implemented in any method or technology capable of storing information, such as computer-readable instructions, data structures, program modules, or other data. In this regard, the system memory 404 and storage medium 408 depicted in FIG. 4 are examples of computer-readable media.

For ease of illustration and because it is not important for an understanding of the claimed subject matter, FIG. 4 does not show some of the typical components of many computing devices. In this regard, the computing device 400 may include input devices, such as a keyboard, keypad, mouse, trackball, microphone, video camera, touchpad, touchscreen, electronic pen, stylus, and/or the like. Such input devices may be coupled to the computing device 400 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 400 (e.g., a client device), or can be integral components of the computing device 400. In some embodiments, multiple input devices may be combined into a single, multifunction input device (e.g., a video camera with an integrated microphone). The computing device 400 may also include output devices such as a display, speakers, printer, etc. The output devices may include video output devices such as a display or touchscreen. The output devices also may include audio output devices such as external speakers or earphones. The output devices can be separate from and communicatively coupled to the computing device 400, or can be integral components of the computing device 400. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Extensions and Alternatives

Many alternatives to the systems and devices described herein are possible. Individual modules or subsystems can be separated into additional modules or subsystems or combined into fewer modules or subsystems. Modules or subsystems can be omitted or supplemented with other modules or subsystems. Functions that are indicated as being performed by a particular device, module, or subsystem may instead be performed by one or more other devices, modules, or subsystems. For example, although automated matching and tagging functionality is described with reference to FIG. 1 as being performed in a service provider computer system 130, it also possible for matching and tagging functionality to be performed by a suitably configured device on an agency network, or some other device.

Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A method performed by a computer system for automatically integrating digital media content with data records relating to events, the method comprising:

receiving, by the computer system over a network, event data associated with a plurality of data records in a database, the event data including fields for each data record in the plurality of data records, one or more of the fields for each data record populated with a value generated from the database, the database stored separately from the computer system at a location remote from the computer system, and the plurality of data records in the database correspond to different incidents to which a law enforcement agency responded, wherein the event data is received in a form of a summary of the plurality of data records in the database generated at once from the database;

receiving, by the computer system, metadata corresponding to a digital media content file, the digital media content file including digital media content, the digital media content recorded by a digital media device at a location of an incident, the metadata including a value generated by the digital media device, wherein the digital media device is separate from the computer system, and wherein the event data is received by the computer system separately from the metadata;

performing a comparison of at least the value in one of the fields of the event data with at least the value in the received metadata;

based on the comparison, automatically identifying a matching event for the digital media content file, wherein the matching event is associated with at least one of the data records and not associated with another data record of the plurality of data records with which the received event data is associated; and after the matching event is identified, automatically modifying the received metadata based on event data associated with the matching event, wherein modifying the received metadata includes adding or updating at least one field of the received metadata based on one or more of the values in the fields of the event data associated with the matching event.

2. The method of claim 1 wherein the comparison comprises:

comparing a user identifier in the received metadata with a user identifier in the event data; and comparing a time frame in the event data with a time frame in the received metadata.

3. The method of claim 1 wherein the comparison comprises at least one of the following:

comparing a user identifier in the received metadata with a user identifier in the event data;

comparing a time frame in the event data with a time frame in the received metadata; and comparing a location in the event data with a location in the received metadata.

4. The method of claim 1 wherein automatically modifying the received metadata comprises adding to the received metadata at least one of the following: an event identifier, an event type, and a location.

5. The method of claim 1 wherein the database comprises a records management system database or a computer-aided dispatch database.

6. The method of claim 1 wherein the digital media content file comprises a video file.

7. The method of claim 1 wherein the digital media content file comprises an audio file.

8. The method of claim 1 wherein the digital media content file comprises an image file.

9. The method of claim 1 wherein the received metadata is included in the digital media content file.

10. The method of claim 1 wherein the event data is included in a database snapshot.

11. The method of claim 10 wherein the database snapshot is generated periodically at a regular time interval.

12. The method of claim 11 wherein the database snapshot includes data in a look-back window that exceeds the regular time interval.

13. The method of claim 1 further comprising analyzing the modified metadata in response to a search query.

14. The method of claim 13 wherein the search query comprises a search parameter, and wherein the modified metadata includes metadata corresponding to the search parameter.

15. The method of claim 14 further comprising providing a search result based on the analysis of the modified metadata.

16. A computer-implemented method for automated integration of digital media content with data records relating to events, the method comprising:

detecting event data in a destination folder, wherein the event data is associated with a plurality of data records in a database, the detection is performed by a server computer, and the data records are associated with different events to which a law enforcement agency responded, and wherein the event data comprises different information for the different events to which the law enforcement agency responded, and wherein the event data associated with the plurality of data records in the database is exported from the database at a same time;

in response to the detecting, uploading the event data to a service provider computer system, the uploading being performed by the server computer;

by the service provider computer system, receiving metadata corresponding to a digital media content file, the digital media content file generated by a digital media device, the digital media device being separate from the server computer and the database, and wherein the event data is received by the service provider computer system separately from the metadata;

by the service provider computer system, performing a comparison of at least a portion of the event data with at least a portion of the received metadata;

by the service provider computer system, automatically identifying a matching event for the digital media content file based on the comparison, wherein the matching event is associated with at least one of the data records and not associated with a second data record of the plurality of data records for which the event data was detected in the destination folder and uploaded to the service provider computer system;

by the service provider computer system after the matching event is identified, automatically modifying the received metadata based on event data associated with the matching event, the modification including adding or updating at least one field of the received metadata based on one or more values in the event data associated with the matching event.

17. The method of claim 16 wherein the event data is included in a database snapshot.

18. The method of claim 17 wherein the database snapshot is generated periodically at a regular time interval.

19. The method of claim 16 further comprising encrypting the event data prior to uploading the event data.

20. The method of claim 19 further comprising, by the service provider computer system, decrypting the event data prior to performing the comparison.

21. A computer system for automatically integrating digital media content with data records relating to events, the computer system comprising a service provider computing device having one or more processors and computer-readable storage media having stored thereon computer-executable instructions configured to cause the service provider computing device to:

receive event data associated with a plurality of data records in a database, the event data including fields for each data record in the plurality of data records, one or more of the fields for each data record populated with a value generated from the database, the database stored separately from the service provider computing device at a location remote from the service provider computing device, and wherein the event data is received in a form of a summary generated from the plurality of data records in the database at a same time;

receive metadata corresponding to a digital media content file, the digital media content file including digital media content, the digital media content recorded by a digital media device at a location of an incident, the metadata including a value generated by the digital media device, and wherein the event data is received by the service provider computing device separately from the metadata;

perform a comparison of at least the value in one of the fields of the event data with at least the value in the metadata;

based on the comparison, automatically identify a matching event for the digital media content file, wherein the matching event is associated with at least one of the data records; and after the matching event is identified, automatically modify the metadata based on event data associated with the matching event, wherein modifying the metadata includes adding or updating at least one field of the metadata based on one or more of the values in the fields of the event data associated with the matching event.

22. The computer system of claim 21 further comprising a dock configured to upload the digital media content file to the service provider computing device.

23. The computer system of claim 21 further comprising a server computer configured to:
   detect the event data in a destination folder;
   encrypt the event data; and
   upload the encrypted event data to the service provider computing device.

24. The method of claim 1 wherein the digital media device is one of a body-mounted camera and a vehicle dash-mounted camera.

25. The method of claim 1 wherein the comparison includes comparing the value in one of the fields for each data record in the event data with the value in the metadata.

26. A computer-implemented method for automatically integrating digital media content with data records relating to events, the method comprising:
   receiving event data associated with a plurality of data records in a database, each data record associated with a particular incident, the event data includes different information for different incidents to which a law enforcement agency responded in a same database snapshot, and wherein the event data is received in a form of a summary of the plurality of data records in the database generated at once from the database;
   receiving metadata corresponding to a digital media content file, the metadata generated by a digital media device, the metadata including a value generated by the digital media device, wherein the digital media device is separate from a computer system, and wherein the event data is received by the computer system separately from the metadata;
   performing a comparison of at least a portion of the database snapshot of the event data with at least a portion of the metadata;
   based on the comparison, automatically identifying a matching event for the digital media content file, wherein the matching event is associated with at least one of the data records; and
   after the matching event is identified, automatically modifying the metadata based on event data associated with the matching event, wherein modifying the metadata includes adding to the metadata or updating the metadata based on the event data associated with the matching event.

27. The method of claim 26 wherein the database snapshot is exported from a records management system (RMS) database, a computer-aided dispatch (CAD) database, or a combined RMS/CAD database.

28. The method of claim 26 wherein the digital media content file includes digital media content and the received metadata is stored in memory separately from the digital media content.

29. The method of claim 26 wherein the plurality of data records includes data records covering a limited period of time, the period of time defined relative to a time at which the snapshot is generated by the database.

* * * * *